Jan. 30, 1962 J. G. BROWN 3,019,184
FILTERING PROCESSES AND APPARATUS FOR USE
IN CONNECTION THEREWITH
Filed July 27, 1954 2 Sheets-Sheet 1

INVENTOR
Judson G. Brown

BY Donald C. Brown
ATTORNEY

Jan. 30, 1962

J. G. BROWN 3,019,184

FILTERING PROCESSES AND APPARATUS FOR USE
IN CONNECTION THEREWITH

Filed July 27, 1954

INVENTOR
Judson G. Brown
BY Donald L. Brown
ATTORNEY

United States Patent Office 3,019,184
Patented Jan. 30, 1962

3,019,184
FILTERING PROCESSES AND APPARATUS FOR USE IN CONNECTION THEREWITH
Judson G. Brown, Wilmette, Ill.
(18 Park Ave., Wakefield, Mass.)
Filed July 27, 1954, Ser. No. 446,069
3 Claims. (Cl. 210—82)

This invention relates to an improved process for the removal of suspended solids from fluids, more particularly for the filtration of finely comminuted solids of low concentration in liquid or gaseous suspending media, and to improved apparatus for use in connection therewith.

Objects of the invention are to provide a filtering process of the character described wherein the slurry or feed, i.e., the fluid containing the solids to be removed, is forced through a filtering medium until a solids cake of predetermined thickness is built up on one surface of said medium and wherein the direction of flow of the slurry through the medium is then reversed, the deposited cake removed and cake built up on the opposite surface of said filtering medium; to provide such a process of a continuous and cyclic nature where cake deposit and discharge is accomplished without appreciable discontinuance of filtration and in a simplified, automatic manner; to provide such a process wherein reversal of the filtering flow is utilized automatically to clean the filtering medium of deposited cake; to provide such a process wherein reversal of flow utilizes, in addition to filtrate, the slurry feed with its desirable plugging features to obtain efficient backwash cleaning of the deposited cake from the filtering medium; and to provide improved apparatus adapted for the performance of said process.

Other objects of the invention are to provide a process of the character described which is cheap and easy to perform, which is efficient in operation, which is peculiarly adapted for the removal of very finely comminuted solids from suspending fluid, and to provide apparatus adapted for the practice of the improved process and which is simple, cheap, easily manufactured and readily controlled.

Other objects of the invention will in part be obvious and will in part appear hereinafter.

The invention accordingly comprises the apparatus possessing the construction, combination of elements and arrangement of parts and the process involving the several steps and the relation and order of one or more of such steps with respect to each of the others which are exemplified in the following detailed disclosure, and the scope of the application of which will be indicated in the claims.

For a fuller understanding of the nature and objects of the invention, reference should be had to the following detailed description taken in connection with the accompanying drawings wherein.

Figure 1:
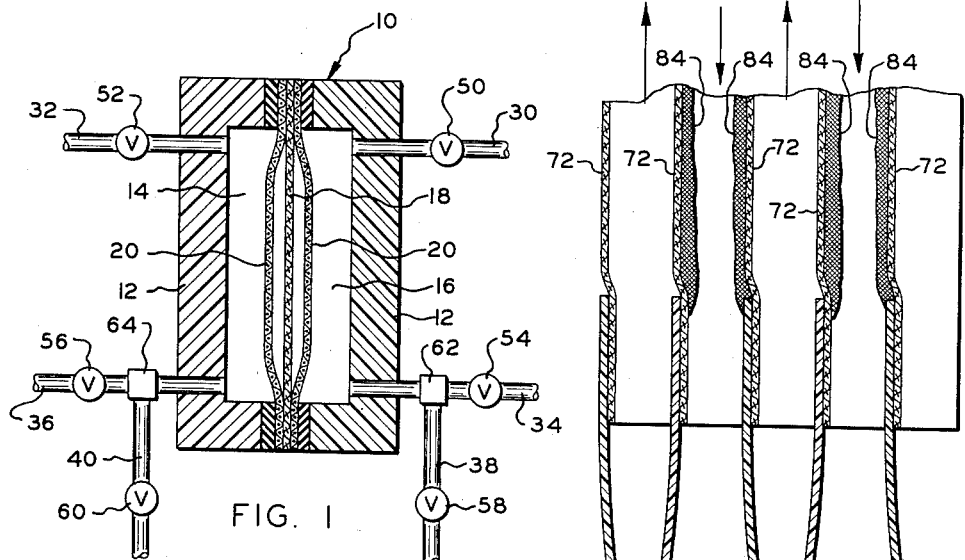
FIGURE 1 is a diagrammatic representation of a simple apparatus embodying the invention and adapted for the performance of the process.
Figure 2:
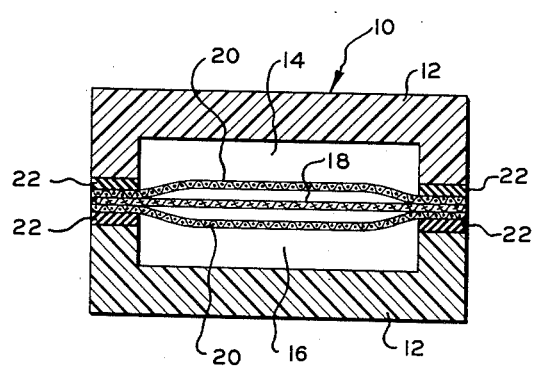
FIG. 2 is a view in horizontal section of a simple unit cell filtering device adapted for use in connection with the process of the invention.

With reference to FIGURES 1 and 2, suitable apparatus for practicing the process of the invention may comprise a simple unit filtering cell 10 comprising a pair of wall closure elements 12 so shaped as to provide a pair of filtering chambers 14 and 16. Mounted between the wall elements 12 of the filtering cell is a filtering medium 18 which may preferably be a filtering cloth of very fine mesh and adequate strength. Any suitable material may be employed as a filtering medium. When a cloth filter is employed, satisfactory results have been achieved by employing materials such as a filter cloth made of nylon and sold commercially under the trademark "Feon 219." This is a tight, strong cloth having an ultimate strength of about 400 pounds per inch parallel to the warp and about 200 pounds per inch parallel to the fill of the cloth. Cloth filtering materials of this general type have proven satisfactory. It will be understood however that, depending upon the character of the material to be filtered and the pressures employed in filtering as hereinafter explained, and such other variables as the desirable thickness of deposited cake, the speed of filtration, the duration of the filtering cycle, etc., other filtering media may be satisfactorily employed.

Preferably, with the employment of a filtering cloth, supporting wire mesh screens 20 are provided, one adjacent each side of the filtering cloth. These screens may be standard 16-mesh galvanized 10 mil wire window screens and may preferably be so positioned with respect to the filtering cloth as to permit some movement of the filtering area of the cloth back and forth between the supporting screens for purposes hereinafter explained. The filtering cloth and its supporting screens are preferably mounted between the wall closure elements 12 by suitable gaskets 22 which may be of rubber. The size of the filtering cell and the volume of the filtering chambers are not particularly important to the satisfactory practice of the process of the invention. Small or large filtering elements may be employed satisfactorily in the process and the shape of the cell and the relative dimensions of the filtering chambers may be modified as desired. It will, however, be understood that when large filtering chambers or cells are employed, additional supports and spacers for the filtering media should be used. These are not shown in the drawings as it is believed that their proper use is well known to those skilled in the art. It will be understood further that multicell filtering units such as those hereinafter described in connection with FIGS. 3 and 4 may be used and that the shape of the filtering device may be modified for example by providing helical filtering units of a continuous nature.

The filtering apparatus shown in FIGS. 1 and 2 is provided with means including conduits and valves for introducing slurry and removing filtrate from the filtering apparatus and for reversing the direction of flow of the introduced slurry and removed filtrate so as to cause filtration through the filtering medium 18 alternately, first from one side as for example from the filtering chamber 16, and then from the other side, as for example from the filtering chamber 14. In the form of the device shown somewhat diagrammatically in FIGS. 1 and 2, this control mechanism may comprise the conduits 30, 32, 34, 36, 38 and 40 and the valves 50, 52, 54, 56, 58 and 60.

In the practice of the process of the invention and with reference to the device shown in FIGS. 1 and 2, the slurry to be filtered may be introduced under pressure into filtering chamber 14 through conduit 36 with valve 60 closed, valve 52 closed and valve 56 opened to permit flow of the slurry into the chamber as described. If then valve 50 is opened to permit clarified filtrate to flow from the filtering device through conduit 30 and with valves 54 and 58 closed, chamber 16 will be at atmospheric pressure and clarified effluent, after passing through filtering medium 18, will be discharged through conduit 30. Under these circumstances, filtration will take place with the deposit of cake on that side of the filtering medium 18 adjacent chamber 14.

When filtration has proceeded until the cake built up on the surface of the filtering cloth 18 is of the desired depth, valve 56 is closed, valve 60 is opened and pressure on the material in chamber 14 thus released, valve 50 is closed, valve 54 is opened with valve 58 remaining closed and the slurry to be filtered is then introduced under pressure into chamber 16 through conduit 34. Filtration then commences from chamber 16 to chamber 14, the clarified effluent being forced through the filtering medium 18 with the deposit of cake on that surface of the filtering medium most closely adjacent chamber 16. As this reversal in direction of flow commences, the clarified effluent remaining in chamber 16 acts as a backwash, washing off the cake which had previously been deposited on that surface of the filtering medium 18 adjacent chamber 14. The deposited cake settles to the bottom of chamber 14 where it mixes with the remaining slurry in the chamber and with the initial clarified effluent passing the filtering medium, forming a concentrated sludge which is washed from the filtering unit during the initial stages of the reversal of the filtering cycle. When this concentrated sludge has been removed, valve 60 is closed, valve 52 is opened and clarified effluent is discharged. It will be understood that under certain circumstances and with certain materials, for example where the cake deposit is relatively of fairly small volume and/or relatively heavy, this interruption in the discharge of clear effluent may be of very short duration. The washed off cake may also be allowed to settle to the bottom of the filtering unit and there accumulate until the quantity of the accumulated cake has reached such proportions as to make removal from the filtering unit desirable. In cases where it is desirable to obtain effluent unmixed with the residual slurry feed that is left in the filtering chambers, the first portion of flow from the chamber may be separated. Another procedure is to drain the chamber of all residual feed before the filtrate enters the chamber, which results in clear effluent being formed sooner.

The discharge of cake from one surface of filtering cloth 18 is accompanied by the deposit of cake on the opposite surface of the cloth. The discharge of cake is frequently not uniform over the entire surface of the filtering medium but occurs spottily when thin cakes are encountered, pieces of cake breaking away from the surface of the cloth over different areas thereof and leaving deposited cake on other areas thereof. As cake is washed from the filtering cloth, less resistance to the passage of filtrate through the cloth arises in those areas where cake has been washed from the cloth than in those areas where cake remains deposited. This results in a more highly concentrated flow of clarified filtrate through those portions of the filtering medium from which cake has been discharged with the result that newly deposited cake is built up more rapidly on the opposite surface of the filtering medium adjacent those areas where cake has been discharged than adjacent those areas on which the cake remains deposited on the medium. This in turn equalizes the resistance of the filtering medium plus deposited cake to the flow of filtrate therethrough and directs a greater volume of filtrate against those areas of the filtering cloth from which the initial deposited cake has not been washed. This washes off the deposited cake from these areas, making them less resistant to the flow of filtrate and causing a heavier deposite of newly formed cake over those areas. This in turn equalizes the deposit of cake over the entire area of the filtering medium 18 adjacent chamber 16. This automatic control of filtering rates through various areas of the filtering medium 18 with the resulting optimum usefulness of the combined filtering medium and deposited cake as a means for insuring substantially complete removal of extremely minute solids at optimum filtration rates from the slurry being filtered is an important feature of the invention.

Normally in the practice of the invention the backwashing of the filtering medium 18 with the removal of all cake from the adjacent surface of the medium is accomplished in a very short period due to the automatic control of the increased flow of filtrate through various areas of the filtering medium as cake is discharged therefrom in the manner described, and thus the filtering cycle may comprise only brief and periodic intervals during which discharged cake, rather than clarified effluent, is being removed from the filtering unit.

After the cake has been discharged through conduit 40, valve 60 may be closed, valve 52 opened and clarified effluent discharged. When cake has been built up to the desired depth on that surface of the filtering cloth 18 adjacent chamber 16, the cycle is reversed, valve 52 is closed, valve 56 is opened, slurry to be filtered is introduced again through conduit 36, valve 58 is opened, valves 54 and 50 remaining closed, cake is washed from that surface of the filtering medium 18 adjacent chamber 16 and discharged through conduit 38 until deposited cake has been removed, when valve 58 is closed, valve 50 is opened and clarified effluent discharged through conduit 30.

The cycle may be repeated with periodic reversal of flow through the filtering medium in the manner described.

During the filtering process and when the filtering cloth or other resilient or pliable filtering member is employed, the reversal of flow and the periodic pressurizing of slurry introduced into chambers 14 and 16 causes motion of the filtering medium 18 relative to the walls of the filtering chamber and the supporting wire meshes 20. This may take the form of a sudden forcing of the filtering medium with the deposited cake against first one and then the other of the adjacent wire mesh supports, and, in many cases, this is a desirable feature of the invention and of the apparatus described, for it serves to break up the deposited cake into small portions or pieces which are more readily removed from the surfaces of the filtering medium and easier and more rapidly removed from the apparatus, and this in turn serves to shorten the duration of that portion of the filtering cycle during which washed off cake is flushed from the filtering cell.

In FIGURE 1, 62 and 64 will be understood as representing pressure gauges and it will also be understood that any suitable means of creating a pressure drop across the filtering element between the slurry introduced into the filtering unit and the discharge port may be employed.

The process of the present invention and apparatus of the type described are particularly adapted for use in connection with the filtration of highly dispersed solids of small particle size. For example, the process and apparatus are adapted to the filtration of such slurries as talc having a particle size of less than 1 micron and having a concentration of less than 2% in the suspending medium, or such a slurry as a diluted phosphate slime containing about 5% or less of solids.

It will, however, be understood that while the process and apparatus are peculiarly adapted for use in connection with the filtration of very finely comminuted solids in low concentrations in the suspending media, they may be employed with other types of materials. With low concentrations, the duration of the filtering cycle will of course be more extended than with higher concentrations of solids. The apparatus and process are useful in connection with the removal of suspended solids from liquids and from gases and in connection not only with the clarification of fluids by the removal of solids therefrom and the dewatering of solids, but also in connection with the control of fluid-solids reactions, fluid-fluid reactions, countercurrent reactions, the recovery of dust and the filtering of gases.

In the practice of the process with small filtering units, filtration has been accomplished with the use of varying pressures running as high as pressures in the order of 60 to 100 pounds per square inch. These are to be understood as merely illustrative and not as limiting in the process of the invention.

Filtering cycles of various duration and sequence have been employed and, depending upon such factors as the materials filtered, their concentrations, pressures employed, etc., the percentage of time of the filtering cycle utilized in the removal of washed off cake compared with that utilized in the removal of clear filtrate may vary widely. Speaking generally, the cycle will be controlled so as to provide a maximum average filtration rate. The portion of the cycle devoted to the removal of washed off cake is preferably kept to a short period. In the practice of the invention with apparatus heretofore employed, this has varied from approximately 10% to intervals of the order of 30% of the duration of the filtering cycle, but again these are illustrative only and are not to be understood as limiting the process.

Preferably the process should be controlled so as to provide a marked pressure drop across the filtering medium between the pressure on the slurry in the feed intake chamber and pressure on the filtrate in the discharge chamber. A pressure drop of the order of 25 to 40 pounds per square inch has been found highly satisfactory. It will be understood that the pressure drop may vary during the filtering cycle and may be less at the commencement of the cycle than subsequently.

The duration of the filtering cycle may be controlled within wide limits, again depending upon the character of the material to be filtered, the concentration of the suspended material, the pressures employed, the temperatures involved, and other factors. The process has been satisfactorily practiced with filtering cycles of fairly short duration, for example of the order of a very few minutes and with more extended filtering cycles. Filtering cycles of the order of 15 minutes with pressure drops across the filtering medium of the order of 30 pounds per square inch have been found satisfactory for use in connection with suspensions of dilute concentrations of talc fines such as those heretofore described, for example.

In the process as described in connection with the apparatus shown in FIGS. 1 and 2, clarified filtrate is mixed with discharged cake and residual feed and the mixture caused to flow from the discharge chamber during the initial portion of each reversal of the filtering cycle. This involves a loss of clarified filtrate and this loss of filtrate may be reduced by practicing the process of the invention under such conditions that clarified filtrate is not mixed with the discharged cake as it is removed from the filtering apparatus. The discharged cake, for example, may be permitted to accumulate within the filter and may be subsequently removed by temporarily shutting down the filtering apparatus and removing the deposited cake therefrom. It will be understood that, depending upon the results desired, different procedures may be employed.

Figure 4:
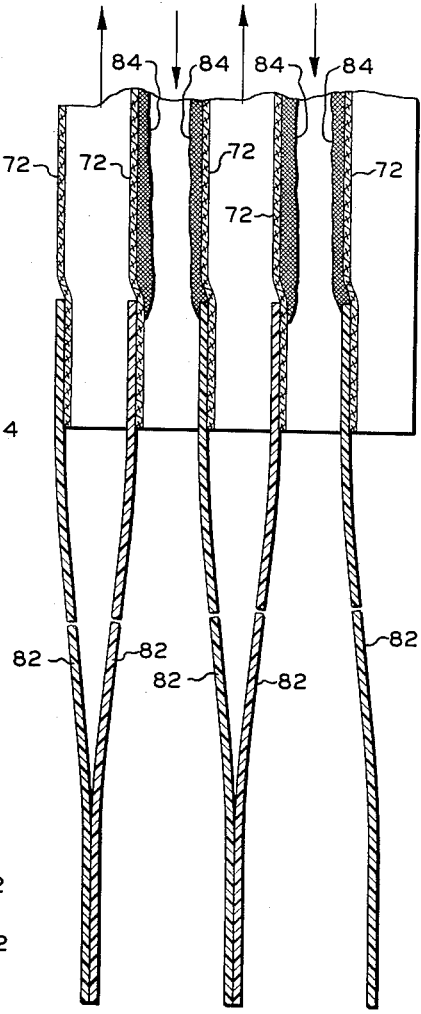
FIG. 4 is a fragmentary, detailed view in vertical section of a portion of the device shown in FIG. 3.
Figure 3:
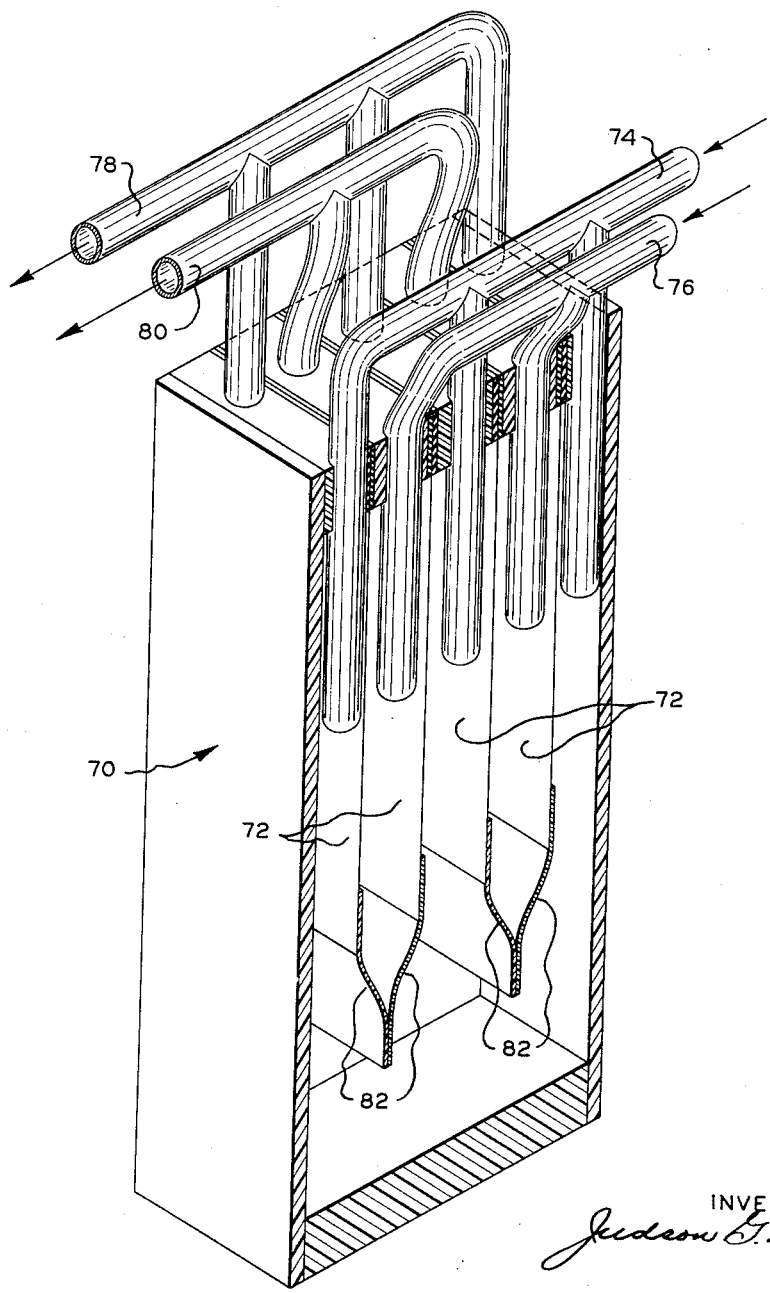
FIG. 3 is a view, partially in perspective and partially in vertical section, of a modified form of filter adapted for use in the process of the invention.

In FIGS. 3 and 4, apparatus is disclosed adapted for the practice of the process with the accumulation of cake within the filter and its periodic removal therefrom. 70 represents a multicell filter unit in which the filtering media 72 are positioned to provide a plurality of adjacent filtering chambers. 74 and 76 represent conduits for the introduction of the slurry to be filtered alternately into first one and then another series of alternate chambers. As shown, for example, conduit 74 is adapted for the introduction of feed into the first, third and fifth chambers of the filter apparatus and conduit 76 is adapted for the introduction of feed into the second and fourth filtering chambers. It will be understood that suitable valves and pressurizing means are provided for controlling the feed and for pressurizing the material in the input chambers. Conduits 78 and 80 are adapted for filtrate discharge, conduit 80 receiving filtrate from the second and fourth filtering chambers and conduit 78 receiving filtrate from the first, third and fifth filtering chambers.

It will be understood that in the operation of the device, when feed is introduced through conduit 74, filtrate is withdrawn through conduit 80, and when feed is introduced through conduit 76 filtrate is withdrawn through conduit 78 and that suitable valves are provided in connection with conduits 78 and 80 as well as with conduits 74 and 76 for controlling the flow so that the filtering cycle may be reversed and its duration controlled in the manner indicated in connection with the description of FIGS. 1 and 2.

Associated with the filtering media 72 and positioned to cooperate therewith to periodically close and open the bottoms of the chambers formed thereby are valve means which may take the form of flap valves 82 which may be of rubber or like material and which may operate in the following manner. When feed is introduced through conduit 74 under pressure, it fills the bottom of the filtering device and causes the flap valves 82 to close in the manner shown in FIG. 3, thus sealing off the bottoms of the second and fourth filtering chambers, i.e., those into which slurry is subsequently introduced through conduit 76. As a result, the slurry in the first, third and fifth filtering chambers and in the bottom of the filtering unit is under uniform pressure. There is a pressure drop across each filtering medium 72 and the clarified effluent as it fills the second and fourth filtering chambers rises and is removed through conduit 80. Cake 84 is deposited on the surfaces of the filtering media adjacent the first, third and fifth chambers. When the cake has been built up to the desired extent, slurry is introduced through conduit 76 under pressure into the second and fourth filtering chambers, the flap valves 82 open and then reclose to seal off the bottoms of the first, third and fifth filtering chambers, and the filtering cycle continues with reversal of flow through the filtering media 72 and with a discharge of effluent or clarified filtrate through conduit 78. As the flap valves 82 open and the flow through the filtering media 72 is reversed, deposited cake is washed from the surfaces of the filtering media in the manner heretofore described and settles gradually to the space on top of the flap valves. With the next reversal, as the flap valves open the cake will drop to the bottom of the filtering tank from which it may subsequently be removed, after an appreciable accumulation of cake, by draining. With such a device, it will be apparent that the filtering process, with the reversal of the filtering cycle, the cleaning of the filtering media and the accumulation of cake and discharge of clear effluent may continue uninterruptedly for protracted periods, again depending upon the concentration of the solids in the slurry introduced into the device and other factors previously discussed.

In addition to the types of materials previously mentioned as those with which the process of the present invention is particularly adapted to be employed, mention should be made of the adaptability of the process and apparatus for use in connection with the clarification of water supplies, their use in connection with industrial intermediates and similar products and industrial and municipal wastes. Under certain circumstances, the process may be employed to force or draw fluids through beds of solids for the purpose of insuring excellent contact between the fluids and solids so that reactions therebetween may be controlled or insured. Also, the process and apparatus are adaptable for controlling the concentration of solids in fluids while causing intimate contact and mixing and maintaining a countercurrent flow in which the solids flow in one direction while the fluid travels in the opposite direction. This is accomplished by repeated filtration and redispersal of deposited cake in the apparatus. If the solids are heavier than the fluid, the solids will travel with the pull of gravity and displace the lighter fluid in the opposite direction. The fluid is also separated as filtrate and redispersed in a cyclical manner as it progresses through the apparatus countercurrent to the flow of the solids. This feature of the invention is particularly suited for countercurrent fluid-solids reactions and leaching operations. So also, the process and apparatus of the present invention may be adapted to the mixture of fluids by drawing them through the filtering medium in the same manner as in a pulse column used for solvent extraction.

The apparatus of the present invention is inexpensive and easy to construct. It is cheap and easy to operate. The substantially continuous duration of the filtering cycle with the elimination of shut-downs for cleaning the filter results not only in reduced filtering costs but in higher yield per unit time in comparison with previously available filters.

Since certain changes may be made in the above apparatus and process without departing from the scope of the invention herein involved, it is intended that all matter contained in the above description or shown in the accompanying drawings shall be interpreted as illustrative and not in a limiting sense.

What is claimed is:

1. In filtering apparatus for the cake filtration of low concentration suspensions of finely comminuted solids, in combination with means providing a plurality of filtering chambers and means, including conduits and valves, for introducing material to be filtered into each said chamber whereby the flow direction of material to be filtered may be cyclically reversed, a thin, sheetlike filtering element positioned between said chambers, filter supporting means positioned adjacent each face of said filtering element and spaced therefrom and adapted to cut into small areas cake deposited upon that surface of the filtering element brought into contact therewith, and mounting means positioning said filtering element for movement into and out of engagement with each of said filter supporting means.

2. Filtering apparatus as called for in claim 1 wherein said filter supporting means comprise substantially rigid screens.

3. A process for the cake filtration of low concentration suspensions of finely comminuted solids comprising passing the material to be filtered through a thin, sheetlike filtering medium with a pressure drop across said medium to cause the formation and deposit of cake on one surface of said medium and the discharge of clarified filtrate therethrough, cyclically reversing the direction of flow through said medium of said material, including a quantity of clear filtrate, to cause the formation and deposit of cake alternately on opposite surfaces of said medium and the discharge of previously deposited cake therefrom, the quantity of cake deposited on a surface of said filtering medium during each half cycle substantially exceeding the quantity of solids retained within the body of said medium during said half cycle, and utilizing unequal cake discharge from adjacent areas of said filtering medium with the reversal of the direction of flow of material therethrough to control the volume of flow of material through said medium and to cause corresponding inequality in the deposition of cake on adjacent areas of the opposite surface of said medium to ensure effective discharge of all cake from the first said surface thereof.

References Cited in the file of this patent

UNITED STATES PATENTS

| | | |
|---|---|---|
| 189,771 | Morgan | Apr. 17, 1877 |
| 194,016 | Tittle et al. | Aug. 7, 1877 |
| 343,251 | Neracher | June 8, 1886 |
| 399,260 | Haefner | Mar. 12, 1889 |
| 419,843 | Divoll | Jan. 21, 1890 |
| 1,549,933 | Toumey | Aug. 18, 1925 |
| 2,013,776 | Weisman | Sept. 10, 1935 |
| 2,547,797 | Lorrey et al. | Apr. 3, 1951 |
| 2,584,206 | Hodsdon | Feb. 5, 1952 |

FOREIGN PATENTS

| | | |
|---|---|---|
| 1,402 | Great Britain | 1880 |
| 134,928 | Sweden | Mar. 26, 1952 |